Patented Aug. 7, 1951

2,563,417

UNITED STATES PATENT OFFICE 2,563,417

METHOD OF REMOVING SYNTHETIC RESIN COATINGS

Leopold Pessel, Philadelphia, Pa., assignor to Radio Corporation of America, a corporation of Delaware No Drawing. Application April 29, 1947, Serial No. 744,775

8 Claims. (Cl. 134—6)

This invention relates to compositions for stripping synthetic resin coatings from various surfaces and, more particularly, relates to compositions which have especial utility in removing insulation from copper wire and, at the same time, preparing the wire to receive a coat of solder.

In the electrical industries, it is frequently necessary to strip coatings comprising synthetic resinous materials from the ends of wires preparatory to soldering them to terminals or to other wires. This necessitates a great deal of hand labor by skilled operators and, in the case of certain insulation materials, such as polyvinyl formal, is an expensive and time consuming procedure. The present invention includes discovery of a particular series of compositions which may be used to soften even the most resistant synthetic resin materials in a matter of seconds. These compositions leave the wire base in a clean and bright state to which a layer of solder may immediately be applied without subjecting the wire to any further treatment such as the application of a flux.

One object of the invention is to provide compositions of matter for stripping synthetic resin coatings from any base.

Another object of the invention is to provide compositions for facilitating the stripping of synthetic resin coatings from a wire base.

Another object is to provide compositions for stripping highly resistant synthetic resin coatings from copper wire.

Another object is to provide compositions for the rapid softening of resinous materials comprising one or more of the polyvinyl acetal series.

Another object of the invention is the provision of an improved method of preparing a coated copper wire for the reception of solder.

Still another object of the invention is the provision of an improved method of preparing a wire to receive solder, using a stripping agent, including pentanedione and a boosting agent.

The various ketones have long been used as solvents for synthetic resinous materials, although even these usually excellent solvents have previously been found to have little effect on certain of the resinous materials, especially those of the polyvinyl acetal type. However, in factory processes for applying solder to the ends of wires, it is desirable to have a material which will soften the insulation and loosen it from the wire so that it may easily be stripped off from the ends by the operator with the aid of fingernails or pliers. In order to be practical, the stripping material should not be poisonous or generate poisonous fumes since this entails hazards to the workers' health or else the installation of expensive airconditioning means to make the hazard as small as possible. Heretofore, the few solvents which have been used to soften the more resistant types of synthetic resin coatings not only generated obnoxious fumes but also attacked the wire or left on its surface objectionable deposits which prevented the application of solder without first removing these deposits or subjecting the wire to further steps of preparation resulting in increased processing costs.

With the present invention, however, the discovery has been made of a solvent which can be used to prepare an insulated wire for soldering which does not supply dangerous fumes nor leave any deposit on the surface of a wire which would prevent the successful application of a thin coat of solder. The particular material which is used in the practice of this invention is pentanedione, also known as 2,4-pentanedione and also called acetylacetone, which has the chemical formula $CH_3COCH_2COCH_3$. The effect of this solvent is particularly pronounced in the case of some of the baked synthetic resin coatings which yield only with extreme slowness to other solvents. These coating materials are used on modern insulated conductors due to their toughness and inherent solvent resistance as well as for their resistance to other deteriorating influences.

The manner in which the improved method may be performed is illustrated in the following example: The end of a copper magnet wire containing a thin coating of polyvinyl acetal synthetic resin is dipped in a bath of pentanedione maintained at 150° F. for about 180 seconds. The wire is removed from the liquid, gentle pressure is applied between the nails of the thumb and forefinger and the coating is enabled to be stripped off with a single motion. The end of the wire from which the coating has been removed is then dipped immediately in a tinning or soldering bath of conventional composition which provides it with a closely adherent coating of metal which does not deteriorate on long standing, indicating that no corroding deposits have been left on the wire. This tinned or soldered end may then be immediately soldered to a terminal or to another wire with no further treating. The solder bath may be 60 per cent tin and 40 per cent lead or 40 per cent tin and 60 per cent lead or of any other conventional composition, such as silver solder compositions.

The time of treatment necessary to soften the coating material sufficiently to be stripped off with a single motion varies with the temperature of the bath. With a given polyvinyl acetal coating on No. 30 copper wire a treating time of 3,000 seconds was required at 75° F., 180 seconds at 150° F., and only 80 seconds at 210° F.

This action compares in rapidity to other solvents, such as formic acid, formaldehyde, or hydrochloric acid. One of the principal advantages of using pentanedione as compared with previous softening agents, however, is that when the previous solvents, such as cresylic acid, formic acid, formaldehyde or concentrated hydrochloric acid, are used they result in corrosion of the wire and this makes more difficult the application of a tinning or soldering coat. They also give off fumes which are hazardous to the health of the operators. Other known organic solvents, which have no deleterious effects on the wire, do not compare in rapidity of action with the compositions of the present invention.

Although pentanedione, alone, was found to have a beneficial action in the preparing of wires for soldering, the addition of certain booster agents was found to decrease greatly the time of treatment. A preferred boosting agent, which greatly accelerates the action of pentanedione is water. At room temperatures, up to 5 per cent, water may be mixed with pentanedione without the two materials separating into a two-phase system. Higher amounts of water may be added if the temperature is increased.

When used at 150° F., a bath comprising 95 per cent pentanedione and 5 per cent water lowers the softening time upon polymerized oil-resin enamels to 120 seconds. It decreases the softening time of resins of the polyvinyl acetal type to about 90 seconds. With 90 per cent pentanedione and 10 per cent water, the corresponding softening times for the two different types of coatings were 90 and 60 seconds, respectively, at 150° F. For the 75 per cent pentanedione and 25 per cent water the times are only 30 and 12 seconds under similar temperature conditions. The accelerating effect is thus seen to rise with the amount of water added, in amounts of water up to at least 50 percent of the pentanedione. Water, alone, of course, has absolutely no softening action upon these materials. The addition of water to this system and the accelerating effect of water on the pentanedione is, therefore, entirely unexpected.

Since it is desirable to have a composition which will not separate into two phases at room temperatures in order to avoid inconvenience in storage, compositions were sought which would have the desired low treating time at practical elevated temperatures and which would remain in a single phase even after standing at room temperatures (70° F.) for long periods of time. It was found that mutual solvents for pentanedione and water may be added to the system without changing the optimum treating time by a great deal and at the same time providing a single phase system. A preferred mutual solvent is diacetone alcohol. A composition containing 50 per cent pentanedione, 25 per cent diacetone alcohol and 25 per cent water will soften an oil-resin enamel coating in about 60 seconds and the polyvinyl acetal type in about 15 seconds at 150° F.

Although many different types of mutual solvents for pentanedione and water were tried, none was found which had any adverse effect, their inclusion when used in amounts up to 25 per cent not slowing down the softening effect of the pentanedione and water enough to make their use impractical. Besides diacetone alcohol, other ketones such as acetone, acetonyl acetone, etc., are almost equally applicable. Esters such as methyl lactate, ethylene-glycol-mono-ethyl-ether, ethyl lactate, etc., may be used. Alcohols, such as ethyl alcohol, isopropyl alcohol or tetrahydrofurfuryl alcohol, or others, besides diacetone alcohol, have been found almost equally advantageous and other miscellaneous mutual solvents for pentanedione and water, such as gamma-valero lactone, propylene oxide and dioxane have all been tried and found operative.

Although the invention is perhaps most valuable when used with such coatings as the polyvinyl acetal resins or polymerized oil-resin enamels, since these are extremely difficult to remove by means previously proposed, these softening agents exert a dissolving or softening action on synthetic resins in general and have particular application in preparing any wire coated with a synthetic resinous material for the application of solder. Besides those resins already mentioned, there have been used resins of the phenolic type such as phenol formaldehyde, polymerized allyl esters, copolymers of styrene and allyl esters, furane resins, superpolyamides, alkyds, melamine formaldehyde, etc. Although some of these resins may be softened with other solvents, it is advantageous to be able to soften them rapidly with a material which leaves no unwanted residue after the coating is stripped from the wire and, in general, the compositions of the present invention are considerably faster in action.

With the phenolic type resins of equal coating thickness, the softening time was found to be considerably less than for the polyvinyl acetal resins and softening of silicone resins took place in about one-sixth the time required to soften polyvinyl acetal resins with pentanedione alone.

| Wire Gage No. | Type of Coating | Pentanedione, Seconds | Pentanedione, 75 Water, 25 | | Pentanedione, 50 Diacetone Alcohol, 25 Water, 25 | |
|---|---|---|---|---|---|---|
| | | | Sec. | Boosting Factor | Sec. | Boosting Factor |
| 30 | Polyvinyl Acetal | 180 | 12 | 15 | 15 | 12 |
| 31 | Phenolic Resin | 50 | 20 | 2.5 | 20 | 2.5 |
| 0 | do | 150 | 30 | 5.0 | 150 | 1.0 |
| 40 | do | 180 | 60 | 3.0 | 90 | 2.0 |
| 30 | Silicone Resin | 30 | 15 | 2.0 | 20 | 1.5 |
| 30 | Allyl Ester Resin | 240 | 30 | 8.0 | 30 | 8.0 |
| 30 | Styrene Copolymer Resin | 30 | 10 | 3.0 | 10 | 3.0 |
| 30 | Furane Resin | 300 | 60 | 5.0 | 80 | 3.7 |
| 30 | Polymerized Oil Enamel | 25 | 10 | 2.5 | 15 | 1.7 |
| 30 | Superpolyamide | 4,000 | 180 | 22.0 | 180 | 22.0 |
| Al Sheet | Alkyd Type Enamel | 10 | 5 | 2 | 5 | 2 |
| Glass Rod | Melamine Formaldehyde Resin | 60 | 15 | 4.0 | 20 | 3.0 |
| Wood Panel | do | 80 | 20 | 4.0 | 25 | 3.2 |

The preceding table shows the softening time for various resins at 150° F., using compositions comprising either pentanedione alone, pentanedione and water, or pentanedione, diacetone alcohol and water. The "Boosting Factor" is obtained by dividing the softening time with pentanedione, alone, by the softening time required for the corresponding resin composition when using the composition with booster added. This table also indicates that the compositions of this invention are useful not only in stripping resin coatings from wires but from other surfaces such as aluminum sheets, glass rods or wood penels. The surfaces listed are merely illustrative and may comprise anything to which synthetic resins are commonly applied as coating materials.

The data given in the examples were obtained using coatings of comparative thickness using commercially available magnet wires. It has also been found that the thickness of the coating also determines the speed of softening, the thinner the coating, the more rapid the softening action providing the same diameter of wire is used. For unexplained reasons, in extremely thin wires, an increase in softening time has been found with decreased wire diameter.

It has been noted that the boosting effect of the water on the softening action of the pentanedione increases practically in direct proportion to its content in the compositions up to 50 per cent water or higher but, when using the higher percentages of water, it is necessary to raise the temperature of the compositions to inconvenient points in order to prevent the separation of the mixture into two phases. None of the mutual solvents for water and pentanedione which have been used in the compositions, when used alone, has been found to have any significant softening effect on the resistant types of resinous materials.

In general, the optimum amount of mutual solvent to be added to the compositions varies with the mutual solvent selected. In a composition comprising pentanedione and water in a 2:1 ratio, for every 1 part of diacetone alcohol, for example, there would be needed only 0.8 part of isopropyl alcohol, 0.7 part of tetrahydrofurfuryl alcohol but 1.4 parts of gamma-valero lactone. The addition of more than the optimum amounts of the various mutual solvents exerts a diluting effect and such proportions may be used to lower the cost of the resulting compositions.

As examples of compositions which contain a higher proportion of mutual solvent but which still have a rapid softening action, there may be used pentanedione 30 per cent, water 15 per cent, and diacetone alcohol 55 per cent, or pentanedione 10 per cent, water 10 per cent, and diacetone alcohol 80 per cent. These proportions and the proportions in all previous examples are by volume. The larger percentage of diacetone alcohol serves a definitely useful purpose other than lowering the cost in those cases where the material is to be stored at temperatures below 70° F. since higher relative amounts of the mutual solvent are then required to prevent separation.

There has thus been described a series of compositions having general use as softeners for synthetic resin coatings and giving particularly improved results in preparing insulated wires for soldering operations. The examples given are merely illustrative and the invention is intended to be limited only by the scope of the appended claims.

I claim as my invention:

1. A method of stripping a synthetic resinous coating from a surface comprising treating said coating with a softening agent comprising 2,4-pentanedione 50–95 per cent by volume and water 5–50 percent by volume until said coating is softened a predetermined amount and then wiping said coating from said surface.

2. A method of stripping a synthetic resinous coating from a metal base material comprising treating said coated base material with a softening agent comprising 2,4-pentanedione 50–95 per cent by volume and water 5–50 percent by volume and wiping said coating from said surface.

3. A method according to claim 2 in which said metal base is copper.

4. A method according to claim 2 in which said softening agent is maintained at an elevated temperature below the boiling point of said agent.

5. The method of claim 1 in which said coating is a synthetic resin comprising a polyvinyl acetal.

6. The method of claim 1 in which said coating comprises an oil-resin enamel.

7. A method of stripping a synthetic resinous coating from a metallic electrically conducting wire comprising treating said coating with a softening agent consisting essentially of 50 percent by volume 2,4-pentanedione, 25 percent by volume water, and 25 percent by volume diacetone alcohol until said coating is softened a predetermined amount, and then wiping said softened coating from said wire.

8. A method according to claim 7 in which said resinous coating consists essentially of a polyvinyl acetal.

LEOPOLD PESSEL.

REFERENCES CITED

The following references are of record in the file of this patent:

UNITED STATES PATENTS

| Number | Name | Date |
| --- | --- | --- |
| 1,653,805 | Housekeeper | Dec. 27, 1927 |
| 1,726,623 | Hollnagel | Sept. 3, 1929 |
| 1,884,765 | Lougovoy | Oct. 25, 1932 |
| 2,242,106 | Buckman | May 13, 1941 |
| 2,417,468 | Canziani | Mar. 18, 1947 |
| 2,435,239 | Schub | Feb. 3, 1948 |
| 2,438,038 | Craver | Mar. 16, 1948 |

OTHER REFERENCES

Condensed Chem. Dictionary, Reinhold Publ. Co., New York, 3rd edition (1942), page 45.

Synthetic Organic Chemicals, booklet of Carbide and Carbon Chem. Corp., N. Y., 12th ed. (1945), pages 53 and 54.

Synthetic Organic Chemicals, booklet of Carbide and Carbon Chemical Corp., N. Y., 12th ed. (1945), pages 56 and 57.